Figure 1:
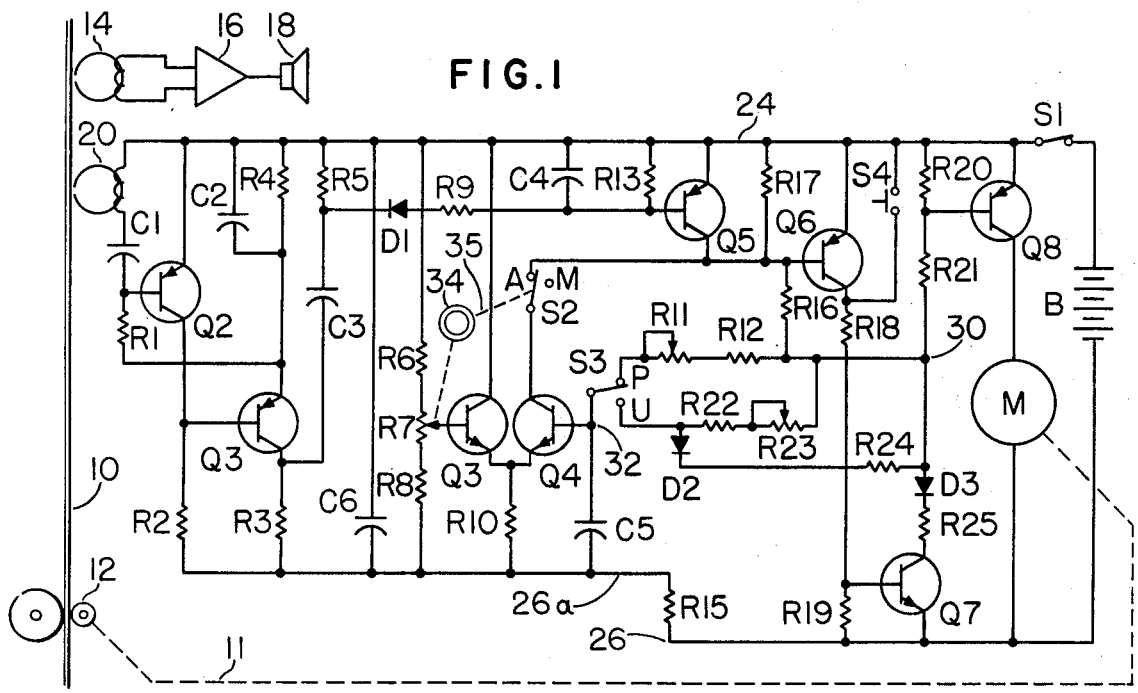

United States Patent [19]
Bell

[11] 3,818,608
[45] June 25, 1974

[54] METHOD FOR PRACTICING SHORTHAND

[76] Inventor: John M. Bell, 3583 Monterosa Dr., Altadena, Calif. 91001

[22] Filed: Aug. 31, 1972

[21] Appl. No.: 285,505

[52] U.S. Cl. .................... 35/8 A, 35/35 C, 35/35 E
[51] Int. Cl. .......................................... G09b 11/08
[58] Field of Search............. 35/8 R, 8 A, 9 R, 9 A, 35/9 B, 35 C, 35 E, 5, 6, 36, 37; 129/100.2 S; 283/45, 46

[56] References Cited
UNITED STATES PATENTS

| | | | |
|---|---|---|---|
| 2,834,928 | 5/1958 | Carter | 318/162 |
| 2,883,767 | 4/1959 | Bell et al. | 35/35 E |
| 2,950,543 | 8/1960 | Ritter et al. | 35/8 R X |
| 3,245,156 | 4/1966 | DeBloois et al. | 35/8 A |
| 3,579,855 | 4/1971 | Worthy et al. | 35/8 A |

*Primary Examiner*—Wm. H. Grieb
*Assistant Examiner*—Vance Y. Hum

[57] ABSTRACT

A magnetic tape playing machine is equipped with electronic means for stopping the tape in response to individual stop signals prerecorded on the tape, and for then restarting the tape after an electronically metered, continuously variable pause time. That time may depend alternatively upon a single manually adjustable control, or upon both the manual control and upon the duration of the preceding "play" time. A manual "start" control can override the automatic restart mechanism, providing individually controllable pause times when the automatic control mechanism is switched off. The invention thus permits a student of shorthand to play "dictation" from a single tape at an effective speed that is continuously variable under his own control from the slowest speeds required by a beginner up to full normal dictation speed.

1 Claim, 2 Drawing Figures

PATENTED JUN 25 1974  3,818,608

METHOD FOR PRACTICING SHORTHAND

This invention has to do with improved methods and apparatus for learning to record dictation by shorthand.

It has been customary for students of shorthand to practice taking dictation from specially recorded magnetic tapes played on a conventional tape playing machine. Tapes are available, for example, on which the "dictation" has been spoken during recording at an abnormally slow rate. With a set of such tapes recorded at different speeds, the student can obtain practice at a speed at least roughly corresponding to his skill.

A serious disadvantage of such systems is that each tape provides only a single speed of transcription. Hence even with a large number of tapes the student must proceed stepwise from one tape to another as his proficiency improves. Moreover, slowly spoken dictation inevitably sounds abnormal and tends to develop bad habits of transcription.

An important object of the present invention is to provide a student of shorthand with a method of practicing the taking of dictation by which he can progressively and gradually increase the effective speed of the dictation as his skill improves. That improved method is made possible, in part, by providing a control system for a tape playing machine by which a student may produce fully natural spoken dictation from a single tape at an effective speed that is continuously variable under his own control.

The invention further produces from a single tape a range of effective speeds that is continuously variable from the very slowest that a beginner requires up to the full dictation speed that is the goal for the particular course. Throughout that range the dictation is presented in the form of small groups of words typically about ten words per group, separated by pauses that are continuously adjustable in length to vary the effective dictation rate. Within each word group the dictation is presented at normal speed, so that speech patterns such as pronunciation and inflection remain normal at all effective dictation speeds.

At the slowest effective dictation speeds, the student controls the length of each pause individually. For effective speeds above 40 or 50 words per minute, and up to the maximum desired dictation speed, the pause length is controlled automatically, but can be altered at any time by the student without changing tapes and without even stopping the dictation.

A further object of the invention is to provide, within the speed range in which the pause control is automatic, two alternative modes of control. Under one mode of automatic control the pause length depends only upon a single manual adjustment. That uniform mode provides the advantage of a uniform pause time at any given setting, so that the student knows definitely how much time he will have to transcribe each word group. Under the other mode of automatic control, each time interval depends not only upon the manual setting but also varies approximately in direct proportion to the length of the preceding section of dictation. That proportional mode has the advantage that the dictation sections can differ widely in length, and yet the student can rely upon having a suitable time to transcribe each section.

The invention provides the described flexibility of control of dictation speed by recording dictation on magnetic tape at full normal dictation speed, such as 120 or 140 words per minute, for example, depending upon the goal of the course. Stop signals are applied to the tape at selected points to divide the dictation into sections of desired length and a tape player is equipped with electronic means for stopping the reproduction in response to each stop signal, and for then restarting the tape player automatically after an electronically metered pause time that is continuously adjustable by the operator. That manual adjustment preferably extends without break substantially to zero pause time, which produces the full dictation speed at which the tape was initially recorded.

The restart mechanism of the invention preferably includes mode selection means for making each pause time depend, when desired, upon the length of the preceding playing time as well as upon the position of the manual adjustment; and includes means for manually restarting the player whenever desired independently of the automatic control, as by momentary depression of a manual "start" button.

Further, the mechanism is provided with means for manually disabling the described automatic control when desired, so that each pause is terminated only upon actuation of the manual restart mechanism. Moreover, that disabling of the automatic control is preferably arranged to be effected automatically when the manual speed adjustment is moved slightly beyond the "slow" end of its range.

The described system has the advantage, for the beginning student, that he can take as much time as he needs to transcribe each word group, and can even refer to the textbook if necessary, without departing from the general pattern of machine control. Once the student has attained a speed of 40 or 50 words per minute, he comes naturally into the range of automatic speed control. Throughout that range, the regularity of effective speed at each speed setting encourages the student to maintain the set pace and to develop a uniform writing pattern. As his skill improves, he can increase the effective dictation speed by as small or as large an increment as he desires; or he can slightly reduce the speed if he has overestimated his ability. He can rewind some tape and repeat the same material at a different speed when desirable. The availability of small increments of speed is especially helpful in breaking through the plateaus of ability that are a known obstacle to progress with conventional techniques.

A full understanding of the invention, and of its further objects and advantages, will be had from the following description of an illustrative manner in which it may be carried out. That description is to be read with reference to the accompanying drawings, in which FIG. 1 is a schematic drawing representing an illustrative embodiment of the invention; and FIG. 2 is a schematic graph representing typical charge and discharge curves of a timing capacitance in accordance with the invention when operating in proportional mode.

Figure 2:
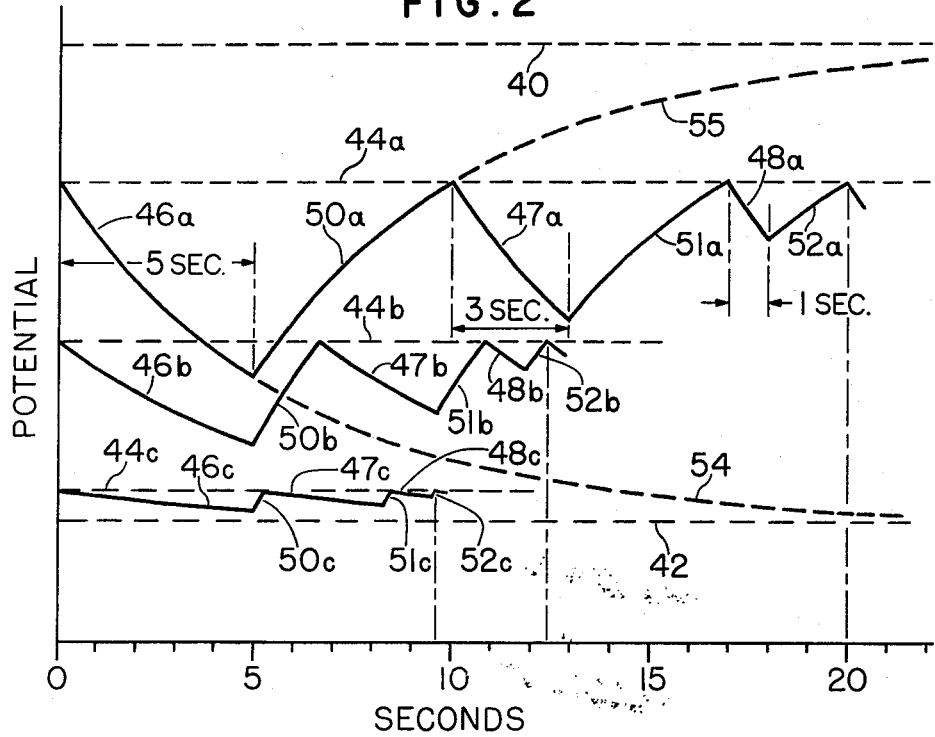

In the illustrative tape control system shown schematically in FIG. 1 the magnetic tape 10 is advanced by the motor M, acting through the conventional coupling 11 and tape drive mechanism 12. The regular audio signal, typically comprising spoken material simulating dictation, is read from the tape by the audio reading head 14, is amplified by the amplifier 16, and is made audible by the loudspeaker 18. All of that equipment may be of conventional design, and does not require detailed description.

The present invention utilizes control signals prerecorded on the tape to stop the tape at definite positions in predetermined relation to the recorded dictation. Such control signals typically comprise short sections of a recorded tone, lasting only 50 to 100 milliseconds each. If the control signals are recorded on the tape in a separate channel from the dictation, as is preferred, the tone used may be in the audio range and is read from the tape by the control signal reading head 20. The signals are then amplified by the transistors Q1 and Q2, typically connected as shown in the drawing to form a two stage amplifier with negative feedback via the resistance R1 for bias control of Q1. The amplified tone signal from the collector of Q2 is rectified by the diode D1, smoothed by the lowpass filter comprising the resistance R9 and the capacitance C4, and supplied to the base of the control transistor Q5 as a negative square wave that corresponds in duration to the length of the tone signal on the tape. Transistor Q5 is normally cut off via the biasing resistance R13, but is rendered conductive in presence of the control signal.

Tape drive motor M is connected in series with the switching transistor Q8 between the positive bus 24 and the negative bus 26, which are maintained at a suitable potential difference by the battery B, with positive bus 24 typically grounded. Conduction in Q8 is controlled by the transistors Q6 and Q7, which are connected as shown to form a bistable latching circuit responsive to input signals supplied at Q6. If Q6 is rendered momentarily conductive, the potential of the base of Q7 is raised, saturating Q7. The potential of the junction 30 is thereby lowered nearly to that of negative bus 26, causing the bias circuit R16 and R17 to lock Q6 on. If that bias is momentarily overridden to cut off Q6, Q7 is also cut off via the bias resistance R19. The potential at junction 30 then rises nearly to that of positive bus 24, locking Q6 off.

The base of switching transistor Q8 is coupled to junction 30 via the bias resistances R20 and R21. Hence Q8 is driven to saturation when Q6 and Q7 are conductive, operating tape drive motor M, and is cut off sharply and reliably when Q6 and Q7 are cut off, stopping the tape.

In the present system, three types of input control signals for shifting bistable latching circuit Q6, Q7 forcibly between tape driving and tape stopping conditions are applied in specific manners which are illustrative of the variety of available circuit designs. Q6 can be forcibly shifted from conductive to cutoff condition to stop the tape by momentary conduction in the control transistor Q5, which is connected between the base of Q6 and positive bus 24 in shunt to the biasing resistance R17. As already described, Q5 is rendered momentarily conductive in response to a stop signal read from tape 10 by head 20.

On the other hand, after termination of the stop signal and provided the switch S2 is closed at "automatic" position, as shown, Q6 can be forcibly shifted from cutoff to conductive condition to restart the tape by momentary conduction in the transistor Q4, which is connected between the base of Q6 and negative bus 26 in shunt to R18 and R19. Illustrative circuitry for controlling Q4 in accordance with the present invention, to restart the tape after a controllably variable time interval, is described below.

The tape can also be restarted by momentary closure of the manual start switch S4, which is typically of push-button type and is connected in shunt to the emitter-collector circuit of Q6. Closure of S4 may be viewed as simulating conduction in Q6, and has the effect of turning on Q7. Q6 is then turned on via the feedback connection through R16, stabilizing the latching circuit in conductive condition. Start switch S4 provides manual restart facility when switch S2 is open at "manual" position. It also permits the student to override the "automatic" operation if he should desire to restart the tape more quickly than the time delay for which the system has been adjusted.

When switch S2 is closed to produce automatic operation of the system, both the "proportional" and the "uniform" modes of control utilize the metering action of the capacitance C5 and its associated circuitry. The negative terminal of C5 is connected directly to negative bus portion 26a. The positive terminal of C5 is connected to junction 30, already described, via one or other of two distinct circuit networks, according to the position of mode selection switch S3. During periods of tape drive, with transistor Q7 saturated and junction 30 at a low potential, C5 discharges toward that potential through the selected network. When the tape is stopped in response to cutoff of Q7, the potential of junction 30 approximates that of positive bus 24. The discharge of C5, if not already completed, is thereby terminated, and it charges toward that positive potential.

The present system provides circuitry by which the tape is restarted during the charging phase of C5, just described, when the potential of the junction 32 at the positive terminal of C5 has reached a definite but adjustable value. For that purpose the transistors Q3 and Q4 are connected as shown to form a differential amplifier of basically known type. Positive potential is supplied to the collector of Q3 directly from positive bus 24, and to the collector of Q4 via closed automatic-manual selection switch S2 and the emitter-base junction of transistor Q6. The emitters of Q3 and Q4 are connected to negative power via the common emitter resistance R10. The base of Q3 is set at a definite but variable reference potential by connection to the brush of the potentiometer R7, which forms with R6 and R8 a voltage divider between the positive and negative buses. Convenient adjustment of R7 is provided by the manual knob 34. The base of Q4 is connected via the junction 32 to the positive terminal of C5.

During circuit operation Q4 is normally cut off, with Q3 conductive and drawing current through emitter resistance R10. With the base of Q3 held at the set reference potential, the current through Q3 adjusts itself to produce in R10 the voltage drop needed to maintain stable operating bias between base and emitter of Q3, thereby setting also the emitter of Q4.

During the charging phase of C5, with the tape drive idle, the potential at the base of Q4 eventually exceeds that of the fixed emitter by sufficient bias to initiate conduction, raising the common emitter potential of Q3 and Q4, and cutting off Q3. Conduction is thus shifted abruptly from Q3 to Q4. That tripping of the differential amplifier occurs accurately and reproducibly as junction 32 reaches a definite trip potential that is substantially equal to the reference potential set at R7. That trip action lowers the potential at the base of Q6, overriding the above described bias circuit which was holding Q6 and Q7 cut off and motor M idle. Q6 and Q7 are thereby turned on, restarting the tape. As the motor starts, conduction in Q7 initiates the discharge of C5, cutting off Q4 and shifting conduction back to Q3. However, Q6 and Q7 both continue to conduct, due to the latching action already described.

As already indicated, mode selection switch S3 selects one or other of two networks through which C5 may be charged and discharged to produce respective modes of motor control. The "proportional" mode is obtained with S3 at terminal P. The positive terminal of C5 is then connected to junction 30 via the adjustable resistance R11 and the fixed resistance R12 in series. Charging and discharging of C5 therefore both take place through the same circuit, and both are under rate control by adjustment of R11. As will be described more fully in connection with FIG. 2, that remarkably simple circuit arrangement causes the pause time after each stop signal to depend both upon the setting of the differential amplifier at R7 and upon the length of the preceding period of dictation.

To obtain the "uniform mode" of operation, switch S3 is set at switch terminal U. The selected network then comprises two paths, one of which determines the charging rate for C5, the other the discharging rate. The charging path is via the adjustable resistance R23 and the fixed resistance R22 to junction 30. The discharging path is via the diode D2 and the resistance 24. D2 is forward biased for discharge current from C5, but blocks charging current, which can therefore flow only via R22 and R23. R22 is selected large enough to limit the maximum charging current to a value that cannot cause Q8 to turn on. The same function is performed by R12 in the proportional network. R24 is smaller than R22, typically by a factor of the order of ten, and is selected to prevent excessive discharge current while allowing C5 to discharge virtually completely in less than the shortest time period that will occur between adjacent stop signals on the tape. Hence, whenever Q7 is cut off by arrival of a new stop signal, the positive terminal of C5 has always reached substantially the same potential. The following phase of charging C5 through R22 and R23 therefore always follows the same time course for any given setting of R23, and the trip point of the differential amplifier is reached after a time that depends only upon the setting of R7. Adjustment of R23, which is typically a factory setting, is useful for setting the longest available pause time at a desired value, such as five seconds, for example.

Before discussing more fully the proportional mode of operation it will be useful to consider certain circuit features that affect the limiting potential which C5 approaches asymptotically during its discharge phase. Motor M typically generates considerable high frequency electrical noise, from which the differential amplifier Q3, Q4 and the signal preamplifier Q1, Q2 are shielded in the present circuit by the low pass filter formed by the resistance R15 and the capacitance C6. The portion 26a of negative bus 26 which lies to the left of R15 as seen in FIG. 1 is raised in potential relative to the negative battery terminal by the voltage drop in R15. Although that voltage drop varies somewhat, especially with the setting of R7, it may be considered constant for most purposes, and is typically of the order of a volt.

Timing capacitance C5 is typically an electrolytic capacitor, which might be damaged if subjected to reverse potential. It is therefore desirable to limit the discharge of C5, as by preventing junction 30 from becoming more negative than negative bus section 26a. That is accomplished in the present circuit by inserting between the collector of Q7 and junction 30 the resistance R25, selected to produce, in response to saturation of Q7, a voltage drop somewhat higher than that in R15.

For reasons to be more fully described, it is desirable to further raise the minimum potential of junction 30 to a level above the trip point of the differential amplifier when R7 is set at the extreme negative end of its range. That minimum trip point is preferably set by selection of R8 as close as is practicable to the potential of bus portion 26a, being spaced above that potential by only the forward bias potential of the emitter junction of Q3 plus the relatively small voltage drop produced in R10 by a minimal operating current. The illustrated insertion of the diode D3 in the collector circuit of Q7 substantially balances that potential difference. Circuit stability against fluctuations in temperature and battery voltage is promoted by balancing the junction potential of Q3 by the junction potential of D3, and balancing the voltage drop in resistance R15 by the similar drop in R25.

FIG. 2 is a somewhat schematic graph showing typical charge and discharge behavior of capacitance C5 during proportional mode operation of the system. The solid line curves represent the potential of junction 32 in arbitrary units plotted against the time in seconds. The x axis of the graph corresponds to the negative battery potential. The horizontal line 40 represents the potential of junction 30 when Q7 is cut off, as during each pause between sections of dictation, and is therefore the level which is approached asymptotically by junction 32 during the charging phase of C5. The line 42 represents the potential of junction 30 when Q7 is saturated, as during tape drive for playing dictation. All discharge curves approach line 42 asymptotically. That line is lifted appreciably above zero potential by the action of R25 and D3, described above. The horizontal lines 44a, 44b and 44c represent the trip potential of differential amplifier Q3, Q4 for three arbitrarily selected settings of R7, 44a corresponding to the upper limit of the range of that adjustment, and line 44c to a setting near the lower limit.

For each of those trip lines on the graph, a series of charge and discharge curves is shown, corresponding to the same assumed series of three successive dictation sections recorded on a tape with stop signals between them. In each series the successive dictation sections last 5 seconds, 3 seconds, and 1 second, respectively. The discharge of C5 during the successive dictation periods is represented by the respective curves 46, 47 and 48, with the letters a, b and c added to designate the three different settings of the trip point. Each of those discharge curves is followed by a charge curve, the duration of which determines the pause time that follows the dictation. Those charge curves are designated 50, 51 and 52, again with letter designations for the trip point settings. Each discharge curve is terminated by shifting of Q7 from conductive to cutoff condition in response to a stop signal read from the tape by head 20. Each charge curve is terminated by tripping of differential amplifier Q3, Q4 as capacitance C5 becomes charged to the set trip potential, indicated by the corresponding line 44a, 44b or 44c in the graph.

Considering first the curves associated with trip point 44a, the initial 5 second discharge curve 46a is extended as the dashed line at 54 to illustrate the asymptotic approach of all discharge curves to line 42. Similarly, the following charge curve 50a is extended as the dashed line 55 to show the asymptotic approach of all charge curves to line 40. For trip point 44a all charge and discharge curves lie predominantly in the middle third of the potential range between the limiting potentials 40 and 42, and the absolute values of the negative slopes of the discharge curves and the positive slopes of the charge curves are roughly equal. That condition leads to corresponding equality between each charge time and the preceding discharge time. That is to say, each pause time is approximately equal to the preceding dictation time.

A particular desired relationship is obtainable by adjustment of R11 of FIG. 1. Although adjustment of R11 varies the slope of both the charge and discharge curves, it also changes the ratio of the pause time to the dictation time. It is generally preferred to set R11, typically as a factory adjustment, so that the pause time is accurately equal to the preceding dictation time for the particular dictation time of 5 seconds and with R7 set at the positive end of its range. Curves 46a and 50a illustrate that relationship. Shorter dictation times are then followed by pause times which are approximately equal to the preceding dictation. It will be noted, however, that for abnormally short dictation times, such as the one second time of curve 48a, the following pause time tends to become progressively longer than the dictation time. That lack of linearity is generally desirable for the student, since his "reaction time" becomes relatively longer as the dictation period is reduced.

As the trip potential is lowered from 44a to 44b and then to 44c, the dictation times are not, of course, affected, since they are determined by the intervals between stop signals on the tape. However, each pause time becomes a progressively smaller fraction of the preceding dictation period, while preserving approximate proportionality. The effect of that relationship upon the effective speed of dictation is made clear from the curves, since the three illustrative dictation sections, comprising a total dictation time of 9 seconds, effectively occupy approximately 20 seconds for trip point 44a, 12 seconds for trip point 44b and less than 10 seconds for trip point 44c. Although only three settings of R7 are illustrated explicitly in FIG. 2, it is clear that an infinite series of settings is available, permitting the student to vary the effective dictation speed as gradually as he wishes.

A significant feature of the described system is that the pause times between dictation sections can be brought to zero. The recorded dictation is then reproduced at the full speed at which it was recorded. That result follows when the trip point is set at or slightly below the potential represented by line 42 in FIG. 2, which is the level of junction 30 during dictation. Under that condition, Q4 may be considered to be held on continuously. Hence, although a recorded stop signal may cut off Q6 for the duration of the signal, it is immediately turned on again by conduction through Q4 as soon as the signal has decayed. Since a stop signal is only 50 or 100 milliseconds in duration, the motor typically coasts through that period with little or no reduction in speed, making the dictation virtually continuous.

In both proportional and uniform modes of automatic operation of the system, it is convenient to enable the student to shift conveniently to manual operation when he has extended the pause time to the longest value available under automatic control. That is accomplished in the present system by coupling the switch S2 to manual knob 34 in such a way that S2 is normally closed, but is opened when knob 34 is rotated slightly beyond the setting for which R7 is at the positive end of its range. Such coupling is indicated schematically by the dashed line 35.

The illustrated control network R11, R12 for the described proportional operation of the system has the advantage of great simplicity, and is generally preferred. However, if desired, separate charging and discharging paths may be provided between switch terminal P and junction 30, including oppositely poled diodes and individually adjustable resistances.

As will be evident to those skilled in the art, many modifications can be made in the particulars of the system that has been described and illustrated without departing from the essence of the present invention.

I claim:

1. The method of learning to record dictation by shorthand, comprising
    providing a magnetic tape having dictation prerecorded thereon at normal dictation speed,
    playing the tape on a magnetic tape player which drives the tape at substantially normal speed to reproduce the dictation in audible form,
    recording the reproduced dictation by shorthand,
    and varying the effective speed at which the dictation is reproduced while maintaining normal pronunciation and inflection at all effective dictation speeds, said effective speed variation comprising
    stopping the player intermittently between syllables of the dictation after playing times of the order of five seconds,
    causing the player to restart automatically after pause times that are continuously variable between approximately said playing time and substantially zero,
    and progressively shortening the pause times to increase the effective speed at which the dictation is reproduced in accordance with the increasing skill of the learner.

* * * * *